United States Patent [19]
Wada et al.

[11] Patent Number: 5,170,278
[45] Date of Patent: Dec. 8, 1992

[54] RETURN OPTICAL DEFLECTING ELEMENT, OPTICAL DEFLECTING ELEMENT AND OPTICAL SCANNER

[75] Inventors: Yoshishige Wada, Tokyo; Nobuo Sakuma, both of Inagi, Japan

[73] Assignee: Ricoh Company, Ltd., Tokyo, Japan

[21] Appl. No.: 739,432

[22] Filed: Aug. 2, 1991

[30] Foreign Application Priority Data

| Aug. 28, 1990 | [JP] | Japan | 2-225974 |
| Aug. 31, 1990 | [JP] | Japan | 2-231288 |
| Sep. 19, 1990 | [JP] | Japan | 2-249289 |
| May 24, 1991 | [JP] | Japan | 3-120449 |

[51] Int. Cl.$^5$ .............................................. G02B 27/17
[52] U.S. Cl. ................................. 359/212; 359/216; 359/217
[58] Field of Search ............... 359/212, 216, 217, 218, 359/219

[56] References Cited

U.S. PATENT DOCUMENTS

| 3,907,197 | 9/1975 | Pöschi et al. | 259/216 |
| 4,154,507 | 5/1979 | Barr | 259/216 |
| 4,344,666 | 8/1982 | Birgmeir et al. | 359/216 |
| 4,690,554 | 9/1987 | Froelich | 359/217 |

Primary Examiner—Janice A. Howell
Assistant Examiner—Kiet T. Nguyen
Attorney, Agent, or Firm—Oblon, Spivak, McClelland, Maier & Neustadt

[57] ABSTRACT

Reflecting faces constituting one or more reflecting face pairs are respectively inclined at 45 degrees with respect to the rotational axis of an optical deflecting element. The reflecting faces are opposed to each other such that these reflecting faces are perpendicular to each other. The reflecting face pairs are arranged with axial symmetry with respect to the rotational axis. A light beam is incident to one of the reflecting faces in parallel to the rotational axis. This light beam is sequentially reflected on this one reflecting face and the other reflecting face constituting the reflecting face pairs together with this one reflecting face. Then, the light beam is returned from the other reflecting face in parallel to the rotational axis and is emitted as a deflected light beam. An optical scanner using the return optical deflecting element and an optical deflecting element is also shown. The optical scanner may have a light source device, a deflector, a member for reflecting a light beam from the deflector in a predetermined direction, etc.

13 Claims, 12 Drawing Sheets

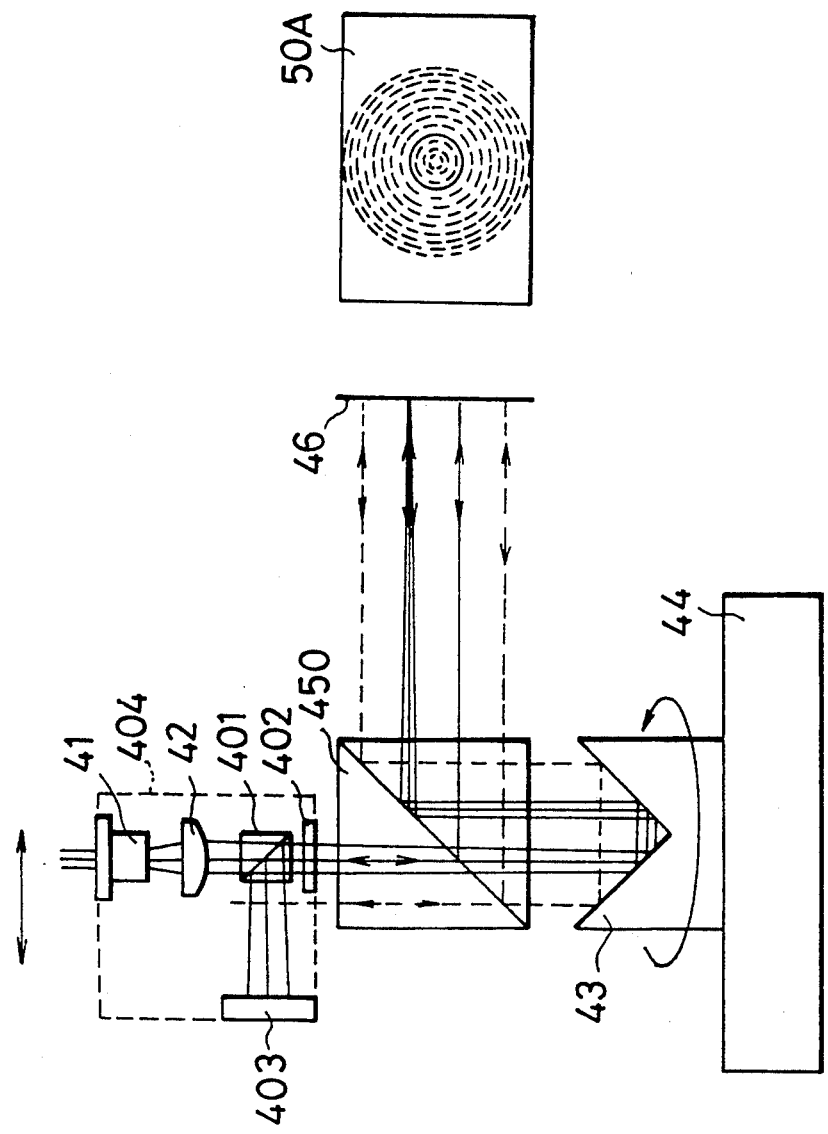

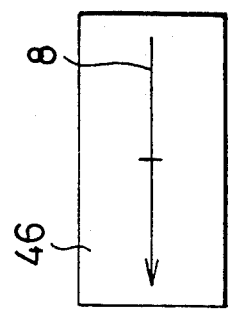
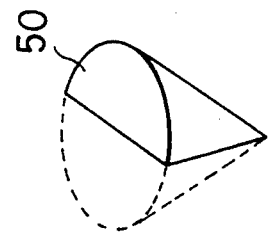
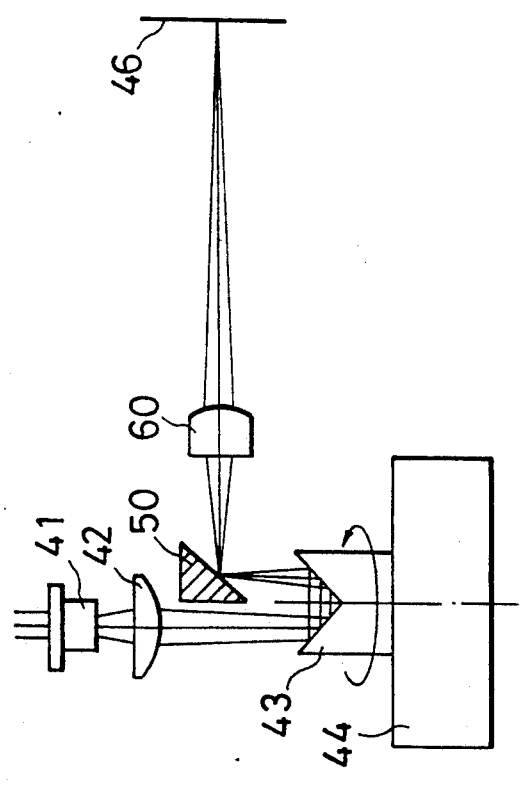
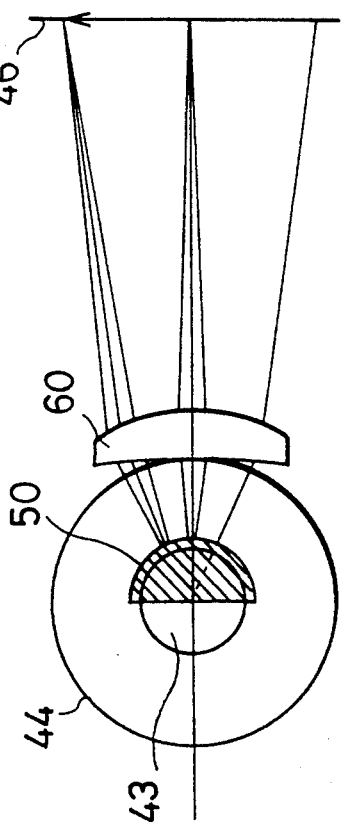

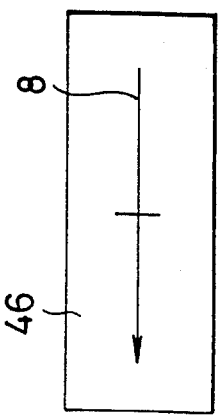
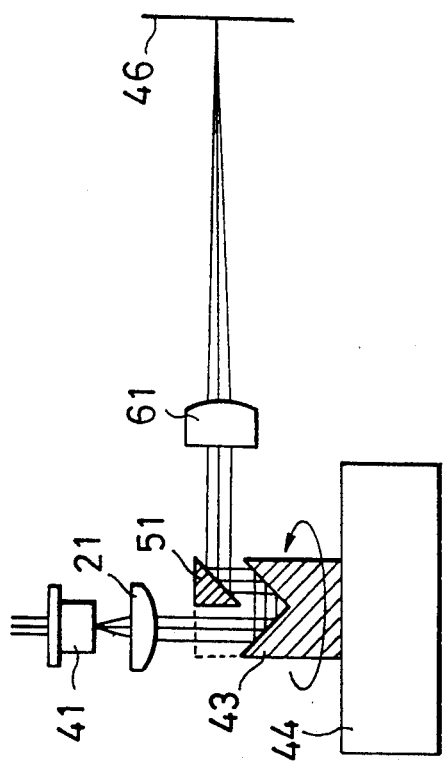
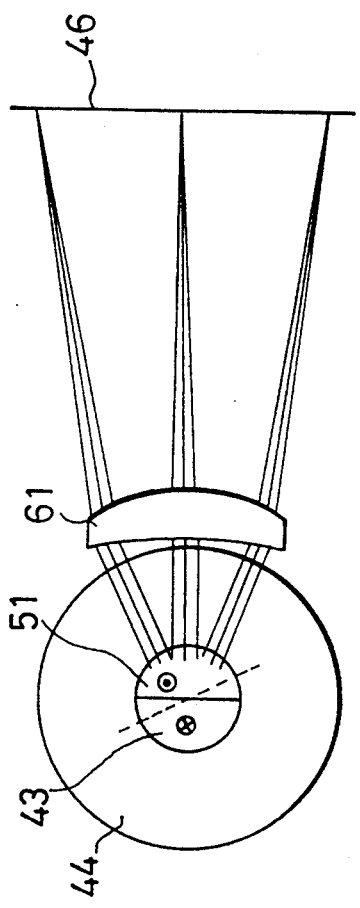

RETURN OPTICAL DEFLECTING ELEMENT, OPTICAL DEFLECTING ELEMENT AND OPTICAL SCANNER

BACKGROUND OF THE INVENTION

1. Field of the Invention

The present invention relates to a return optical deflecting element, an optical deflecting element and optical scanners using the return optical deflecting element and the optical deflecting element.

2. Description of the Related Art

Optical scanning is utilized in a wide technical region of an optical printer, a bar code reader, etc. As is well known, an optical deflecting element for deflecting light in an optical scanning operation is generally constructed by various kinds of deflecting elements such as a rotary polygon mirror, a hologram disk, etc.

When a general return optical deflecting element is used, it is necessary to rotate a recording medium when information is read out of the recording medium and is written to be recording medium. Accordingly, it is impossible to simply write and read information out of the recording medium having a shape in which the recording medium cannot be easily rotated.

In a general optical scanner, it is impossible to solve problems about defocusing caused by field curvature in principle.

Further, it is impossible to greatly reduce a radius of gyration in the case of a general rotary polygon mirror as the optical deflecting element and perform the optical scanning operation at a high speed.

SUMMARY OF THE INVENTION

It is therefore an object of the present invention to provide a novel return optical deflecting element, a novel optical deflecting element and novel optical scanners using the return optical deflecting element and the optical deflecting element, which conventionally do not exist.

Another object of the present invention is to provide a return optical deflecting element in which it is not necessary to rotate a recording medium when information is read out of the recording medium and is written to the recording medium.

Another object of the present invention is to provide an optical scanner for solving the problems about defocusing caused by field curvature in principle.

Another object of the present invention is to provide a return optical deflecting element and an optical deflecting element for greatly reducing a radius of gyration and performing an optical scanning operation at a high speed.

In accordance with a first structure of the present invention, the above objects can be achieved by a return optical deflector formed to be rotatable, comprising n reflecting face pairs each constructed by two reflecting faces opposed to each other such that the two reflecting faces are perpendicular to each other, where n designates a number equal to or greater than one; each of the two reflecting faces being inclined at 45 degrees with respect to a rotational axis of the return optical deflector; the reflecting face pairs being arranged with axial symmetry with respect to the rotational axis; and the return optical deflector being constructed such that a light beam incident to an arbitrary reflecting face in parallel to the rotational axis is sequentially reflected on this arbitrary reflecting face and a reflecting face constituting the reflecting face pairs together with the arbitrary reflecting face and is returned from the reflecting faces in parallel to the rotational axis.

In accordance with a second structure of the present invention, the above objects can be also achieved by an optical scanner comprising a light source device for emitting a beam of light for optical scanning; a deflector for deflecting the light beam from the light source device; and means for reflecting the light beam emitted from the deflector in a predetermined direction; the deflector being constructed by a return optical deflecting element and rotational driving means for rotating the return optical deflecting element around a rotational axis thereof.

In accordance with another structure of the present invention, the above objects can be also achieved by an optical scanner comprising a light source device for emitting a beam of light for optical scanning; a deflector for deflecting the light beam from the light source device; and means for reflecting the light beam emitted from the deflector in a predetermined direction; the deflector being constructed by a return optical deflecting element and rotational driving means for rotating the return optical deflecting element around a rotational axis thereof. The return optical deflecting element is formed to be rotatable and comprises n reflecting face pairs each constructed by two reflecting faces opposed to each other such that the two reflecting faces are perpendicular to each other, where n designates a number equal to or greater than one; each of the two reflecting faces being inclined at 45 degrees with respect to the rotational axis of the return optical deflecting element; the reflecting face pairs being arranged with axial symmetry with respect to the rotational axis. The return optical deflecting element is constructed such that a light beam incident to an arbitrary reflecting face in parallel to the rotational axis is sequentially reflected on this arbitrary reflecting face and a reflecting face constituting the reflecting face pairs together with the arbitrary reflecting face and is returned from the reflecting faces in parallel to the rotational axis.

In accordance with a fourth structure of the present invention, the above objects can be also achieved by an optical scanner comprising a light source device for emitting a beam of light for optical scanning; a deflector for deflecting the light beam from the light source device on the same plane at an equal angular velocity; and an image forming optical system for focusig and forming the light beam deflected by the deflector as a light spot on a scanned face; the deflector having a return optical deflecting element, rotational driving means for rotating the return optical deflecting element around a rotational axis thereof, and a conical face reflecting member for reflecting a light beam emitted from the return optical deflecting element in a predetermined direction. The return optical deflecting element is formed to be rotatable and comprises n reflecting face pairs each constructed by two reflecting faces opposed to each other such that the two reflecting faces are perpendicular to each other where n designates a number equal to or greater than one; each of the two reflecting faces being inclined at 45 degrees with respect to the rotational axis of the return optical deflecting element; the reflection face pairs being arranged with axial symmetry with respect to the rotational axis. The return optical deflecting element is constructed such that a light beam incident to an arbitrary reflecting face in parallel to the rotational axis is sequentially reflected on this arbitrary reflecting face and a reflecting face constituting the reflecting face pairs together with the arbitrary reflecting face and is returned from the reflecting faces in parallel to the rotational axis. The conical face reflecting member has a conical reflecting face having a vertical angle of 90 degrees and is set such that a conical axis of the conical reflecting face is in conformity with the rotational axis of the return optical deflecting element and a vertex side of the conical reflecting face is arranged toward the reflecting face pairs of the return optical deflecting element.

In accordance with a sixth structure of the present invention, the above objects can be also achieved by an optical deflecting element formed to be integrally rotatable as a whole, the optical deflecting element comprising n reflecting face pairs each constructed by an incident mirror face and a return mirror face opposed to each other such that the incident and return mirror faces are perpendicular to each other, where n designates a number equal to or greater than one; each of the incident and return mirror faces being inclined at 45 degrees with respect to a rotational axis of the optical deflecting element; the reflecting face pairs being arranged with axial symmetry with respect to the rotational axis; the optical deflecting element further comprising a conical reflecting face having a vertical angle of 90 degrees and a vertex side directed on a side of the reflecting face pairs; the conical reflecting face having a conical axis in conformity with the rotational axis and formed in accordance with the return mirror face of each of the n reflecting face pairs, the optical path of a light beam being set as an air region. The optical deflecting element is constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is reflected on the conical reflecting face and is emitted from this conical reflecting face.

In accordance with a seventh structure of the present invention, the above objects can be also achieved by an optical deflecting element formed by a transparent material such that the optical deflecting element can be rotated, the optical deflecting element comprising n reflecting face pairs each constructed by an incident mirror face and a return mirror face opposed to each other such that the incident and return mirror faces are perpendicular to each other, where n designates a number equal to or greater than one; each of the incident and return mirror faces being inclined at 45 degrees with respect to a rotational axis of the optical deflecting element; the reflecting face pairs being formed at one end of the optical deflecting element in a direction of the rotational axis thereof and arranged with axial symmetry with respect to the rotational axis; the optical deflecting element further comprising a conical reflecting face formed at the other end of the optical deflecting element in the direction of the rotational axis thereof; the conical reflecting face having a vertical angle of 90 degrees and a vertex side directed on a side of the reflecting face pairs; the conical reflecting face having a conical axis in conformity with the rotational axis and formed in accordance with the return mirror face of each of the n reflecting face pairs. The optical deflecting element is constructed such that a light beam incident to an arbitrary reflecting face in parallel to the rotational axis is sequentially reflected on this arbitrary reflecting face and a reflecting face constituting the reflecting face pairs together with the arbitrary reflecting face and is further reflected on the conical reflecting face and is emitted from the conical reflecting face in a direction perpendicular to the rotational axis.

In accordance with an eighth structure of the present invention, the above objects can be also achieved by an optical scanner comprising a light source device for emitting a beam of light for optical scanning as a parallel light beam; an optical deflector for deflecting the light beam from the light source device; and an image forming optical system for focusing and forming the light beam deflected by the optical deflector as a light spot on a scanned face; the optical deflector having a return optical deflecting element, a reflecting member for reflecting the light beam from the return optical deflecting element in a predetermined direction, and rotational driving means for rotating the reflecting member and the return optical deflecting element around a rotational axis thereof. The return optical deflecting element is formed to be rotatable and comprises n reflecting face pairs each constructed by an incident mirror face and a return mirror face opposed to each other such that the incident and return mirror faces are perpendicular to each other, where n designates a number equal to or greater than one; each of the incident and return mirror faces being inclined at 45 degrees with respect to the rotational axis of the optical deflecting element; the reflecting face pairs being arranged with axial symmetry with respect to the rotational axis. The return optical deflecting element is constructed such that a light beam incident to an arbitrary incident mirror face in parallel to the rotational axis is sequentially reflected on this arbitrary incident mirror face and the return mirror face constituting the reflecting face pairs together with the arbitrary incident mirror face, and is returned from the return mirror face in parallel to the rotational axis. The reflecting member has n light-emitting mirror faces and is formed such that each of the n light-emitting mirror faces corresponds to the return mirror face of each of the n reflecting face pairs and is inclined at 45 degrees with respect to the rotational axis. The reflecting member is constructed such that a light beam reflected on an arbitrary return mirror face is integrally rotated with the return optical deflecting element while this light beam is reflected on a light-emitting mirror face corresponding to this arbitrary return mirror face. The optical scanner is constructed such that the parallel light beam from the light source device is incident to an arbitrary incident mirror face of the return optical deflecting element in parallel to the rotational axis.

In accordance with a ninth structure of the present invention, the above objects can be also achieved by an optical deflecting element formed to be integrally rotatable as a whole, the optical deflecting element comprising n reflecting face pairs each constructed by an incident mirror face and a return mirror face opposed to each other such that the incident and return mirror faces are perpendicular to each other, where n designates a number equal to or greater than one; each of the incident and return mirror faces being inclined at 45 degrees with respect to a rotational axis of the optical deflecting element; the reflecting face pairs being arranged with axial symmetry with respect to the rotational axis; the optical deflecting element further comprising n light-emitting mirror faces inclined at 45 degrees with respect to the rotational axis such that each of the n light-emitting mirror faces corresponds to the return mirror face of each of the n reflecting face pairs, the optical path of a light beam being set as an air region. The optical deflecting element is constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

In accordance with a tenth structure of the present invention, the above objects can be also achieved by an optical deflecting element formed by a transparent material such that the optical deflecting element can be rotated, the optical deflecting element comprising n reflecting face pairs each constructed by an incident mirror face and a return mirror face opposed to each other such that the incident and return mirror faces are perpendicular to each other, where n designates a number equal to or greater than one; each of the incident and return mirror faces being inclined at 45 degrees with respect to a rotational axis of the optical deflecting element; the reflecting face pairs being formed at one end of the optical deflecting element in a direction of the rotational axis thereof and arranged with axial symmetry with respect to the rotational axis; the optical deflecting element further comprising a light beam incident portion and n light-emitting mirror faces formed at the other end of the optical deflecting element in the direction of the rotational axis thereof; the n light-emitting mirror faces being inclined 45 degrees with respect to the rotational axis such that each of the n light-emitting mirror faces corresponds to the return mirror face of each of the n reflecting face pairs, the optical path of a light beam being set as a region of the transparent material. The optical deflecting element is constructed such that the light beam incident to an arbitrary incident mirror face from the light beam incident portion in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

In accordance with the above structures, it is possible to provide a return optical deflecting element in which it is not necessary to rotate a recording medium when information is read out of the recording medium and is written to the recording medium.

Further, it is possible to provide an optical scanner for solving the problems about defocusing caused by field curvature in principle.

Further, it possible to provide a return optical deflecting element and an optical deflecting element for greatly reducing a radius of gyration and performing an optical scanning operation at a high speed.

Further objects and advantages of the present invention will be apparent from the following description of the preferred embodiments of the present invention as illustrated in the accompanying drawings.

BRIEF DESCRIPTION OF THE DRAWINGS

FIGS. 6a and 6b are views showing an optical scanner having the second structure in accordance with another embodiment of the present invention;

FIGS. 8a to 8d are views showing an optical scanner having a fourth structure in accordance with one embodiment of the present invention;

FIGS. 10a to 10c are views showing an optical scanner having an eighth structure in accordance with one embodiment of the present invention;

DESCRIPTION OF THE PREFERRED EMBODIMENTS

Figure 1A:
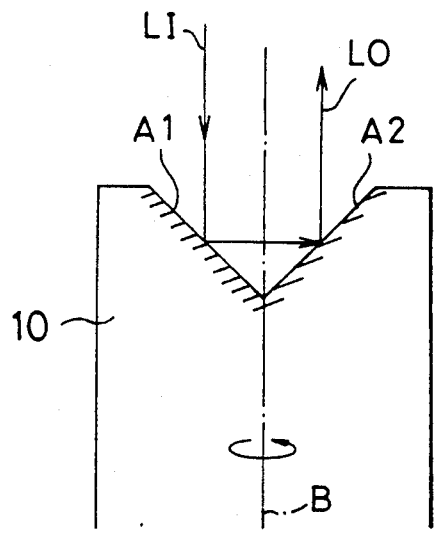
FIGS. 1a to 1d are views showing two typical shapes of a return optical deflecting element having a first structure of the present invention.

The preferred embodiments of a return optical deflecting element, an optical deflecting element and an optical scanner in the present invention will next be described in detail with reference to the accompanying drawings.

In a first structure of the present invention, a return optical deflecting element is formed to be rotatable and has one or more reflecting face pairs.

Each of the reflecting face pairs is constructed by two reflecting faces.

The two reflecting faces constituting each of the reflecting face pairs are opposed to each other such that the two reflecting faces are perpendicular to each other. Each of the two reflecting faces is inclined at 45 degrees with respect to a rotational axis of the return optical deflecting element. Namely, each of the reflecting face pairs is formed such that the two reflecting faces are opened at 90 degrees therebetween on the incident side of a light beam. The respective reflecting face pairs are arranged with axial symmetry with respect to the above rotational axis of the return optical deflecting element.

The return optical deflector is constructed such that the light beam incident to an arbitrary reflecting face is sequentially reflected on this arbitrary reflecting face and a reflecting face constituting the reflecting face pairs together with the arbitrary reflecting face and is emitted from these reflecting faces.

The above construction of the return optical deflecting element having the first structure basically constitutes the construction of a return optical deflecting element used in each of the following optical scanners.

An optical scanner having a second structure has a light source device, a deflector and reflecting means.

The light source device emits a beam of light for optical scanning.

The deflector deflects the light beam from the light source device. This deflector is constructed by the return optical deflecting element of the above first structure and rotational driving means for rotating this return optical deflecting element around the rotational axis thereof.

The reflecting means reflects the light beam emitted from the deflector in a redetermined direction.

The above light source device may have means for modulating intensity of the emitted light beam and/or means for receiving return light from a scanned face. Further, in each of these cases, in accordance with a third structure of the present invention, the light source device can be moved in a predetermined direction and a light beam incident to the return optical deflecting element can be moved in a direction perpendicular to the rotational axis of the return optical deflecting element in accordance with the movement of the light source device.

An optical scanner having a fourth structure has a light source device, a deflector and an image forming optical system.

The light source device emits a beam of light for optical scanning.

The deflector deflects the light beam from the light source device on the same plane at an equal angular velocity.

The image forming optical system focuses and forms the light beam deflected by the deflector as a light spot on a scanned face.

The above deflector has a return optical deflecting element, rotational driving means for rotating the return optical deflecting element around a rotational axis thereof, and a conical face reflecting member for reflecting the light beam emitted from the above return optical deflecting element in a predetermined direction.

The return optical deflecting element is formed to be rotatable and comprises n reflecting face pairs each constructed by two reflecting faces opposed to each other such that the two reflecting faces are perpendicular to each other, where n designates a number equal to or greater than one. Each of the two reflecting faces is inclined at 45 degrees with respect to the rotational axis of the return optical deflecting element. The reflecting face pairs are arranged with axial symmetry with respect to the rotational axis. The return optical deflecting element is constructed such that a light beam incident to an arbitrary reflecting face in parallel to the rotational axis is sequentially reflected on this arbitrary reflecting face and a reflecting face constituting the reflecting face pairs together with the arbitrary reflecting face and is returned from the reflecting faces in parallel to the rotational axis.

The conical face reflecting member has a conical reflecting face having a vertical angle of 90 degrees and is set such that a conical axis of the conical reflecting face is in conformity with the rotational axis of the return optical deflecting element and a vertex side of the conical reflecting face is arranged toward the reflecting face pairs of the return optical deflecting element.

In the optical scanner having the fourth structure, in accordance with a fifth structure of the present invention, the light beam emitted from the light source device is convergent and a convergent state of the light beam is set such that the light beam is converged on the conical reflecting face of the conical face reflecting member after the light beam is returned by the return optical deflecting element.

In optical deflecting elements having sixth and seventh structures of the present invention, the return optical deflecting element and the conical face reflecting member used in the optical scanner having the fourth structure are integrated with each other as one element.

Namely, the optical deflecting element having the sixth structure is formed to be integrally rotatable as a whole and comprises n reflecting face pairs each constructed by an incident mirror face and a return mirror face opposed to each other such that the incident and return mirror faces are perpendicular to each other, where n designates a number equal to or greater than one. Each of the incident and return mirror faces is inclined at 45 degrees with respect to a rotational axis of the optical deflecting element. The reflecting face pairs are arranged with axial symmetry with respect to the rotational axis. The optical deflecting element further comprises a conical reflecting face having a vertical angle of 90 degrees and a vertex side directed on a side of the reflecting face pairs. The conical reflecting face has a conical axis in conformity with the rotational axis and is formed in accordance with the return mirror face of each of the n reflecting face pairs. The optical path of a light beam is set as an air region.

This optical deflecting element is constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is reflected on the conical reflecting face and is emitted from this conical reflecting face.

The optical deflecting element having the seventh structure is formed by a transparent material such that the optical deflecting element can be rotated. This optical deflecting element comprises n reflecting face pairs each constructed by an incident mirror face and a return mirror face opposed to each other such that the incident and return mirror faces are perpendicular to each other, where n designates a number equal to or greater than one. Each of the incident and return mirror faces is inclined 45 degrees with respect to a rotational axis of the optical deflecting element. The reflecting face pairs are formed at one end of the optical deflecting element in a direction of the rotational axis thereof and are arranged with axial symmetry with respect to the rotational axis.

The above optical deflecting element further comprises a conical reflecting face formed at the other end of the optical deflecting element in the direction of the rotational axis thereof. The conical reflecting face has a vertical angle of 90 degrees and a vertex side directed on a side of the reflecting face pairs. The conical reflecting face has a conical axis in conformity with the rotational axis and is formed in accordance with the return mirror face of each of the n reflecting face pairs.

This optical deflecting element is constructed such that a light beam incident to an arbitrary reflecting face in parallel to the rotational axis is sequentially reflected on this arbitrary reflecting face and a reflecting face constituting the reflecting face pairs together with the arbitrary reflecting face and is further reflected on the conical reflecting face and is emitted from the conical reflecting face in a direction perpendicular to the rotational axis.

The differences in structure between the optical deflecting elements of the sixth and seventh structures are as follows. Namely, in the optical deflecting element of the sixth structure, the optical path of a light beam is set in an air region. In contrast to this, in the optical deflecting element of the seventh structure, the optical path of a light beam is set in a transparent material.

An optical scanner having an eighth structure has a light source device, an optical deflector and an image forming optical system.

The light source device emits a beam of light for optical scanning as a parallel light beam.

The optical deflector deflects the light beam from the light source device.

The image forming optical system focuses and forms the light beam deflected by the optical deflector as a light spot on a scanned face.

The above optical deflector has a return optical deflecting element, a reflecting member for reflecting the light beam from the return optical deflecting element in a predetermined direction, and rotational driving means for rotating the reflecting member and the return optical deflecting element around a rotational axis thereof.

The return optical deflecting element is formed to be rotatable and comprises n reflecting face pairs each constructed by an incident mirror face and a return mirror face opposed to each other such that the incident and return mirror faces are perpendicular to each other where n designates a number equal to or greater than one. Each of the incident and return mirror faces is inclined at 45 degrees with respect to the rotational axis of the optical deflecting element. The reflecting face pairs are arranged with axial symmetry with respect to the rotational axis. The return optical deflecting element is constructed such that a light beam incident to an arbitrary incident mirror face in parallel to the rotational axis is sequentially reflected on this arbitrary incident mirror face and the return mirror face constituting the reflecting face pairs together with the arbitrary incident mirror face, and is returned from the return mirror face in parallel to the rotational axis.

The reflecting member has n light-emitting mirror faces formed such that each of the n light-emitting mirror faces corresponds to the return mirror face of each of the n reflecting face pairs and is inclined at 45 degrees with respect to the rotational axis. The reflecting member is constructed such that a light beam reflected on an arbitrary return mirror face is integrally rotated with the return optical deflecting element while this light beam is reflected on a light-emitting mirror face corresponding to this arbitrary return mirror face.

This optical scanner is constructed such that the parallel light beam from the light source device is incident to an arbitrary incident mirror face of the return optical deflecting element in parallel to the rotational axis.

In optical deflecting elements having ninth and tenth structures of the present invention, the return optical deflecting element and the reflecting member used in the optical scanner of the eighth structure are integrated with each other as one element.

Namely, the optical deflecting element having the ninth structure is formed to be integrally rotatable as a whole. This optical deflecting element comprises n reflecting face pairs each constructed by an incident mirror face and a return mirror face opposed to each other such that the incident and return mirror faces are perpendicular to each other, where n designates a number equal to or greater than one. Each of the incident and return mirror faces is inclined at 45 degrees with respect to a rotational axis of the optical deflecting element. The reflecting face pairs are arranged with axial symmetry with respect to the rotational axis.

This optical deflecting element further comprises n light-emitting mirror faces inclined at 45 degrees with respect to the rotational axis such that each of the n light-emitting mirror faces corresponds to the return mirror face of each of the n reflecting face pairs. The optical path of a light beam is set as an air region. The optical deflecting element is constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

The optical deflecting element having the tenth structure is formed by a transparent material such that the optical deflecting element can be rotated. This optical deflecting element comprises n reflecting face pairs each constructed by an incident mirror face and a return mirror face opposed to each other such that the incident and return mirror faces are perpendicular to each other, where n designates a number equal to or greater than one. Each of the incident and return mirror faces is inclined at 45 degrees with respect to a rotational axis of the optical deflecting element. The reflecting face pairs are formed at one end of the optical deflecting element in a direction of the rotational axis thereof and are arranged with axial symmetry with respect to the rotational axis.

This optical deflecting element further comprises a light beam incident portion and n light-emitting mirror faces formed at the other end of the optical deflecting element in the direction of the rotational axis thereof. The n light-emitting mirror faces are inclined at 45 degrees with respect to the rotational axis such that each of the n light-emitting mirror faces corresponds to the return mirror face of each of the n reflecting face pairs. The optical path of a light beam is set as a region of the transparent material. The optical deflecting element is constructed such that the light beam incident to an arbitrary incident mirror face from the light beam incident portion in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

As mentioned above, the optical deflecting element having the tenth structure is formed by a transparent material and the optical path of the light beam is set in the transparent material. In this case, in accordance with an eleventh structure of the present invention, a portion of the optical deflecting element for emitting the light beam reflected on the light-emitting mirror faces may be constructed by a plane perpendicular to the emitted light beam. Otherwise, in accordance with a twelfth structure of the present invention, a portion of the optical deflecting element for emitting the light beam reflected on the light-emitting mirror faces may be constructed by a cylindrical face having a generating line parallel to the rotational axis.

In the respective optical scanners mentioned above, in addition to the above-mentioned constructional elements, it is possible to suitably arrange a mirror for bending the optical path of a light beam in accordance with a layout of the optical system when necessary. Further, in each of the return optical deflecting element and the optical deflecting element, the angle formed between the respective reflecting faces and the rotational axis of each of the optical deflecting elements may be substantially equal to an angle of 45 degrees. The angle formed between the two reflecting faces constituting the reflecting face pairs may be also substantially equal to an angle of 90 degrees.

In the optical deflecting element, the direction of a deflected light beam is a direction perpendicular to the rotational axis of the optical deflecting element. In each of the return optical deflecting elements having the first structure, etc., each of the reflecting faces constituting the reflecting face pairs can be set to the indident mirror face and the return mirror face unless the return optical deflecting element is integrally rotated together with the reflecting member. Namely, each of the reflecting faces constituting the reflecting face pairs can be set to the incident mirror face and the return mirror face unless the reflecting member used in the optical scanner is rotated in synchronization with the rotation of the return optical deflecting element. When the reflecting face pairs and the reflecting member are integrally rotated as in the return optical deflecting element of the eighth structure and the respective optical deflecting elements mentioned above, the reflecting faces of the reflecting member are arranged in accordance with the return mirror face. Accordingly, in the above case, a predetermined one of each of the reflecting face pairs is set to the incident mirror face and the other one thereof is set to the return mirror face.

In the return optical deflecting element, the reflecting faces constituting the reflecting face pairs are inclined at 45 degrees with respect to the rotational axis of the return optical deflecting element. These reflecting faces are opposed to each other at 90 degrees therebetween. Accordingly, a light beam incident to one of the reflecting faces in parallel to the rotational axis is reflected on this one reflecting face. Thereafter, this light beam is then reflected on the other reflecting face constituting the reflecting face pairs together with the above one reflecting face and is returned from the other reflecting face in a direction parallel to the rotational axis. The light beam is deflected and rotated around the above rotational axis in accordance with the rotation of the return optical deflecting element.

In the optical deflecting element, the light beam deflected and rotated around the rotational axis in accordance with the rotation of the reflecting face pairs is further reflected on a conical reflecting face and a light-emitting mirror face. Thus, a direction of the deflected light beam is set to a direction perpendicular to the rotational axis of the optical deflecting element.

As mentioned above, in the present invention, the light beam is basically reflected and returned from the reflecting face pairs by a so-called two-mirror principle so as to deflect the light beam. Accordingly, no high accuracy in inclination angle of each of the reflecting faces constituting the reflecting face pairs with respect to the rotational axis of the optical deflecting element is required.

FIGS. 1a to 1d show two examples of a return optical deflecting element having a first structure in accordance with one embodiment of the present invention.

Figure 1B:
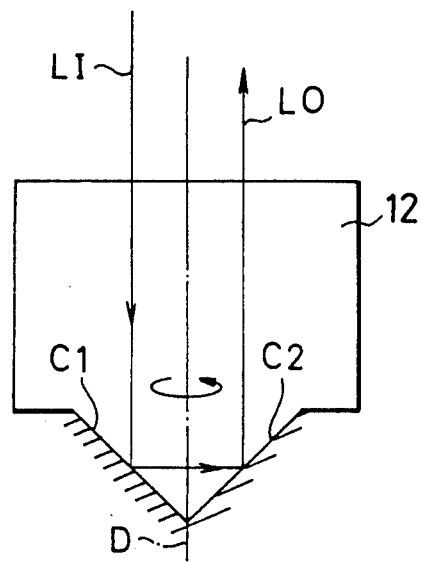
Figure 1C:
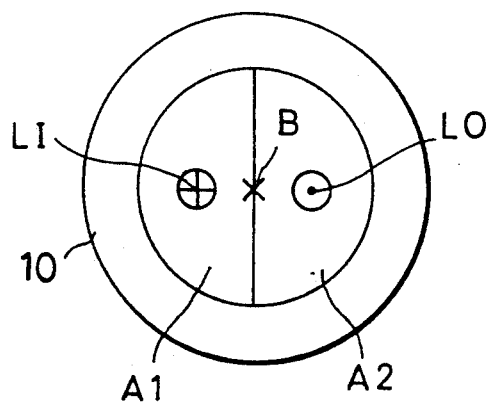

In FIGS. 1a and 1c, a return optical deflecting element 10 is constructed such that one end portion of a rotating body in a direction of a rotational axis B thereof is cut and formed in the shape of a wedge to form a pair of reflecting faces A1 and A2. In this embodiment, for example, the rotational shaft of a motor can be used as the rotating body constituting the return optical deflecting element.

The reflecting faces A1 and A2 constituting the reflecting face pair are opposed to each other such that these reflecting faces A1 and A2 are perpendicular to each other. The reflecting faces A1 and A2 are inclined at 45 degrees with respect to the rotational axis B.

Figure 1D:
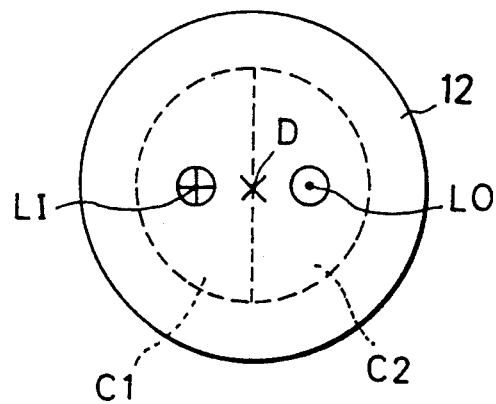
Figure 2A:
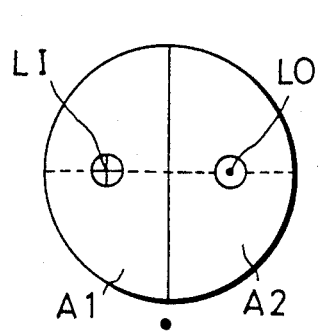
FIGS. 2a to 2e are views for explaining optical deflection caused by the return optical deflecting element.
Figure 2B:
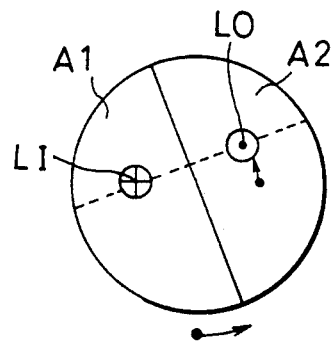
Figure 2C:
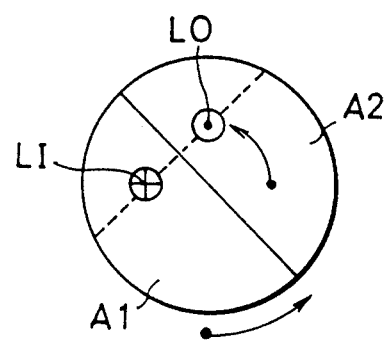
Figure 2D:
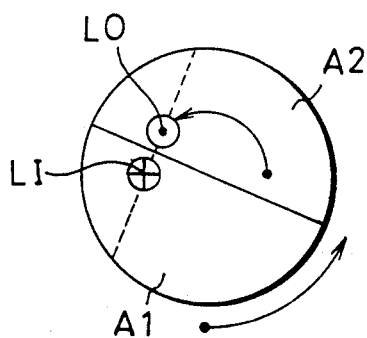
Figure 2E:
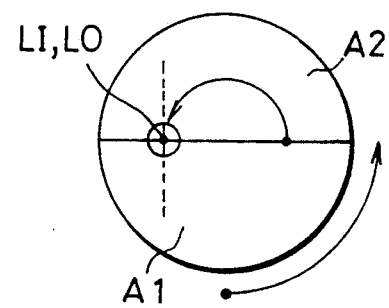

In FIGS. 1b and 1d, a return optical deflecting element 12 is formed by a transparent material such as glass, plastic, etc. A reflecting layer is formed in a projecting portion having a wedge shape and projected in a lower portion of the return optical deflecting element shown in FIGS. 1b and 1d. This reflecting layer has reflecting faces C1 and C2. The reflecting faces C1 and C2 are opposed to each other such that these reflecting faces are perpendicular to each other. The reflecting faces C1 and C2 are inclined at 45 degrees with respect to a rotational axis D of the return optical deflecting element 12.

A beam of light is incident onto the reflecting face C1 in parallel to the rotational axis D from a planar portion of the return optical deflecting element 12 arranged on a side thereof opposite to the pair of reflecting faces C1 and C2. The light beam is then reflected on the pair of reflecting faces C1 and C2 and is emitted from the above planar portion of the return optical deflecting element 12 in parallel to the rotational axis D. In this embodiment, the light beam can be totally reflected on the reflecting faces C1 and C2 by suitably selecting a material of the return optical deflecting element 12. In such a case, it is not necessary to form a reflecting layer on the reflecting faces C1 and C2.

FIGS. 1c and 1d respectively show incident states of the light beams incident onto the reflecting faces A1 and C1 and emitting states of the light beams emitted from the reflecting faces A2 and C2. In FIGS. 1c and 1d, the incident and emitting states of the light beams are seen from directions of the rotational axes B and D. An incident light beam LI is transmitted from a front side of a paper face to a rear side thereof. An emitted light beam LO is transmitted from the rear side of the paper face to the front side thereof. Namely, as shown in each of FIGS. 1a and 1b, the incident light beam LI is incident to each of the reflecting faces A1 and C1 in parallel to the rotational axis of the return optical deflecting element. The incident light beam LI is then reflected on each of the reflecting faces A1 and C1 and is next reflected on each of the reflecting faces A2 and C2 and is emitted therefrom as the emitted light beam LO.

FIGS. 2a to 2e are views for explaining a change in the relation in position between the incident light beam LI and the emitted light beam LO in accordance with rotation of the return optical deflecting element 10 as an example.

The return optical deflecting element 10 is sequentially rotated every 22.5 degree in the counterclockwise direction from FIG. 2a to FIG. 2e. The incident light beam LI is incident to the reflecting face in a constant spatial position. The incident position of the incident light beam LI is unchanged, but the emitted light beam LO is rotated at a rotational speed twice that of the return optical deflecting element 10 in the same direction as a rotational direction of the return optical deflecting element 10. Accordingly, the emitted light beam LO is rotated twice while the return optical deflecting element 10 is rotated at one time.

The above explanation relates to the case of a pair of reflecting faces. However, it is possible to form two or more pairs of reflecting faces.

Figure 3A:
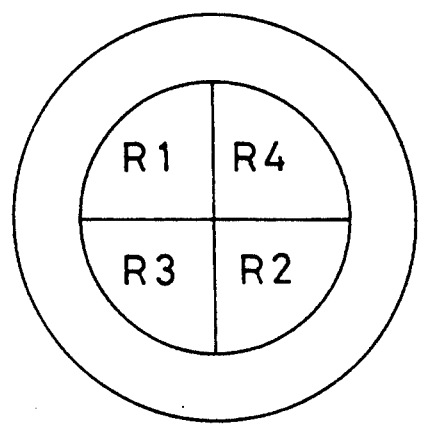
FIGS. 3a to 3c are explanatory views showing three examples of the return optical deflecting element having two or more pairs of reflecting faces.
Figure 3B:
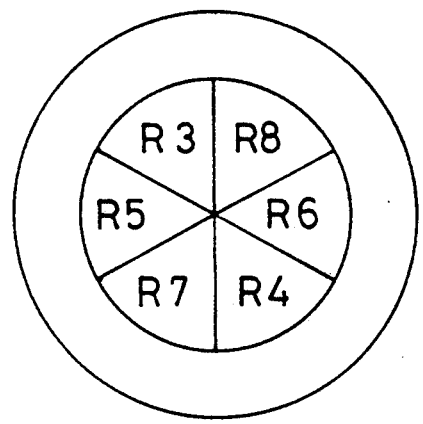
Figure 3C:
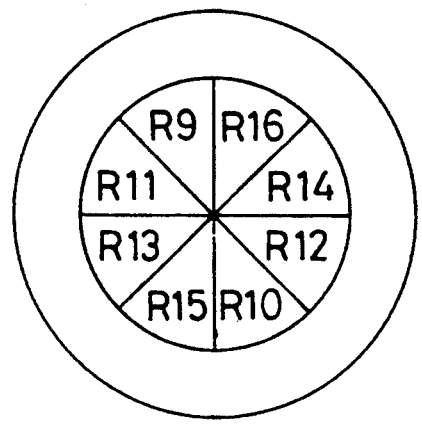

FIG. 3a shows an example of two reflecting face pairs composed of a pair of reflecting faces R1 and R2 and a pair of reflecting faces R3 and R4. FIGS. 3b and 3c respectively show three and four reflecting face pairs. In FIG. 3b, reflecting faces R3 and R4, reflecting faces R5 and R6, and reflecting faces R7 and R8 constitute the three reflecting face pairs. In FIG. 3c, reflecting faces R9 and R10, reflecting faces R11 and R12, reflecting faces R13 and R14, and reflecting faces R15 and R16 constitute the four reflecting face pairs.

An optical scanner having a second structure in accordance with one embodiment of the present invention will be described next.

Figure 4A:
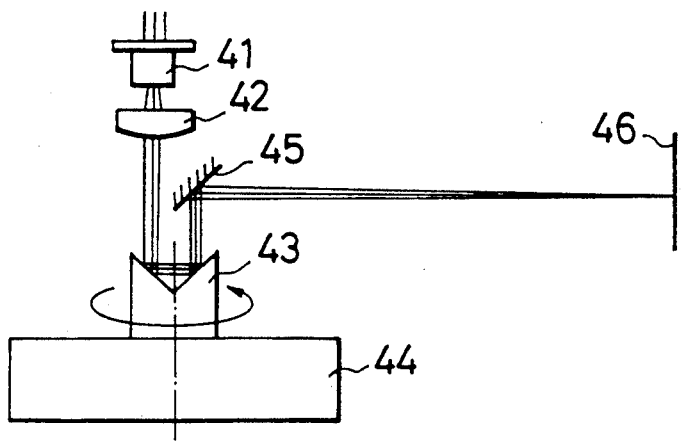
FIGS. 4a and 4b are views showing an optical scanner having a second structure in accordance with one embodiment of the present invention.
Figure 4B:
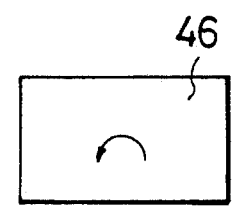

In FIGS. 4a and 4b, reference numerals 41, 42 and 43 respectively designate a light source, a coupling lens and a return optical deflecting element. Reference numerals 44, 45 and 46 respectively designate a motor, a plane mirror and a scanned face. The light source 41 is constructed by a light-emitting element such as a semiconductor laser, a light-emitting diode, etc. In this embodiment, the light source 41 is constructed by a semiconductor laser.

As shown in FIG. 4a, a light beam emitted from the light source 41 is changed to a converged light beam by the coupling lens 42. The light source 41 and the coupling lens 42 constitute a light source device. The converged light beam emitted from the light source device is incident to the return optical deflecting element 43 in parallel to a rotational axis thereof. This incident light beam is then reflected on a pair of reflecting faces and is emitted therefrom in parallel to the rotational axis of the return optical deflecting element 43. The return optical deflecting element 43 is similar to that shown in FIG. 1a and has one reflecting face pair.

The light beam emitted from the return optical deflecting element 43 is incident to the plane mirror 45 as a reflecting means. The plane mirror 45 has a mirror face facing a side of the return optical deflecting element 43. The plane mirror 45 is fixedly arranged in a constant spatial position of the optical scanner such that the mirror face of the plane mirror 45 is inclined 135 degrees with respect to the rotational axis of the return optical deflecting element 43. The light beam emitted from the return optical deflecting element 43 is reflected on the plane mirror 45 toward the scanned face 46. The light beam reflected on the plane mirror 45 is incident onto the scanned face 46 such that this light beam is perpendicular to the scanned face 46.

When the motor 44 as a rotational driving means rotates the return optical deflecting element 43 around the rotational axis thereof, the light beam emitted from the return optical deflecting element 43 is rotated along a circle around the rotational axis of the return optical deflecting element. Thus, as shown in FIG. 4b, the light beam emitted from the return optical deflecting element 43 draws an arc locus on the scanned face 46.

A convergent state of the converged light beam emitted from the light source device is adjusted such that this converged light beam is focused and formed as a light spot on the scanned face 46. The length of an optical path from the light source device to the scanned face 46 is constant irrespective of the rotation of the return optical deflecting element 43 by nature of the return optical deflecting element 43 as two mirrors. Accordingly, the light beam is focused and formed as a light spot on the scanned face 46 at any time.

A range of the locus of the light spot on the scanned face 46 is determined by a size of the plane mirror 45 as a reflecting means. In this embodiment, the plane mirror 45 is arranged on only the right-handed side of the rotational axis of the return optical deflecting element 43. Accordingly, the light spot draws a semicircular locus on the scanned face 46 in accordance with the rotation of the return optical deflecting element 43. Therefore, in this embodiment, if the converged light beam from the light source device is modulated in intensity by modulating light-emitting intensity of the light source 41 in the light source device, optical information can be written in a semicircular shape to a recording medium in conformity with the scanned face 46.

Figure 5A:
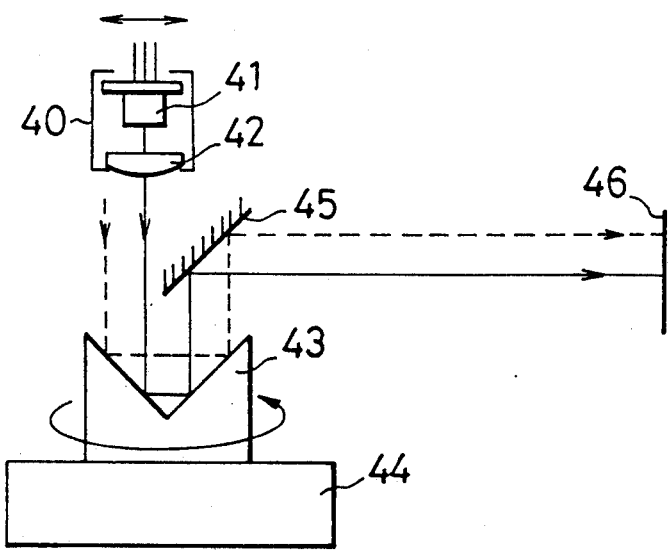
FIGS. 5a and 5b are views showing an optical scanner having the second structure in accordance with another embodiment of the present invention.
Figure 5B:
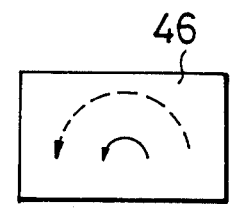

FIGS. 5a and 5b show a modified example of the optical scanner shown in FIGS. 4a and 4b. For brevity, constructional portions similar to those shown in FIGS. 4a and 4b are designated by the same reference numerals.

In the embodiment shown in FIGS. 5a and 5b, a light source 41 and a coupling lens 42 constituting a light source device are integrally formed by a casing 40. The light source 41 and the coupling lens 42 can be displaced in an arrow direction, i.e., in a direction perpendicular to the rotational axis of a return optical deflecting element 43.

When the light source device is displaced in the arrow direction, a distance between the rotational axis of the return optical deflecting element 43 and a light beam incident to this return optical deflecting element 43 is changed. Accordingly, it is possible to change the radius of a semicircular locus drawn by a light spot on a scanned face 46. Therefore, if the intensity of a light beam emitted from the light source device is modulated and the light source device is displaced in the arrow direction in accordance with this modulation, optical information can be written in a concentric or spiral arc shape to a semicircular area portion of a recording medium arranged in conformity with the scanned face 46.

FIGS. 6a and 6b show an optical scanner having the second structure in accordance with another embodiment of the present invention. In FIGS. 6a and 6b, a light source device is constructed by integrally forming a light source 41, a coupling lens 42, a deflecting beam splitter 401, a light-receiving element 403 and a ¼ wavelength plate 402 by using a casing 404. The light source device can be displaced in an arrow direction. Accordingly, this embodiment also relates to a third structure of the optical scanner.

The return optical deflecting element 43 is similar to that shown in each of FIGS. 4 and 5.

A beam splitter 450 is used as a reflecting means. The light source 41 is constructed by a semiconductor laser and emits a beam of light linearly deflected in a predetermined direction. This light beam is converged by the coupling lens 42. A refracting action of the coupling lens 42 is set such that this converged light beam is formed as a light spot on a scanned face 46.

The converged light beam is transmitted through the deflecting beam splitter 401 and the ¼ wavelength plate 402 and is then incident to the beam splitter 450. After the light beam is transmitted through the beam splitter 450, the light beam is incident to the return optical deflecting element 43. The light beam reflected and emitted from the return optical deflecting element 43 is incident to the beam splitter 450 and is reflected thereon. The light beam reflected on the beam splitter 450 is incident to the scanned face 46, thereby forming a light spot thereon. The beam splitter 450 has a size for reflecting the light beam emitted from the return optical deflecting element irrespective of a light-emitting position of this light beam. Accordingly, the light spot draws a circular locus on the scanned face 46 in accordance with rotation of the return optical deflecting element 43.

Figure 7A:
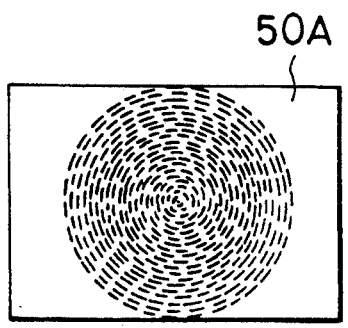
FIGS. 7a to 7d are views showing four examples of a scanned medium which can be scanned by the optical scanner in the embodiment of the present invention shown in FIGS. 6a and 6b.

In this embodiment, an information recording medium 50A is arranged in conformity with the scanned face 46. As shown in FIG. 7a, information is recorded in a spiral shape onto the information recording medium 50A. It is possible to scan a spiral information track by the light spot by displacing the light source device in an arrow direction at a predetermined speed while the return optical deflecting element 43 is rotated.

The light beam reflected on the information recording medium 50A is modulated by information recorded thereon. This light beam is reversely transmitted as return light to the deflecting beam splitter 401 through the beam splitter 450, the return optical deflecting element 43, the beam splitter 450 and the ¼ wavelength plate 402. A deflecting direction of the return light in the deflecting beam splitter 401 is rotated 90 degrees from an original deflecting direction by an action of the ¼ wavelength plate 402. Accordingly, the return light is reflected on the deflecting beam splitter 401 and is then incident to the light-receiving element 403 as a light-receiving means. Thus, the information on the information recording medium 50A can be read as an output of the light-receiving element 403.

Figure 7B:
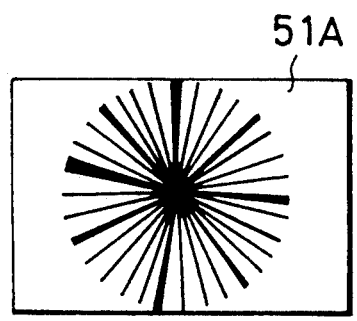
Figure 7C:
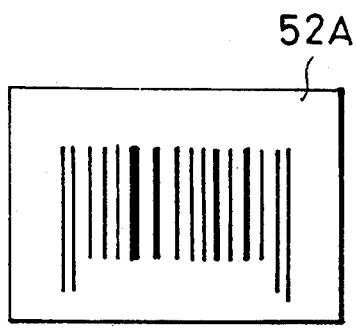
Figure 7D:
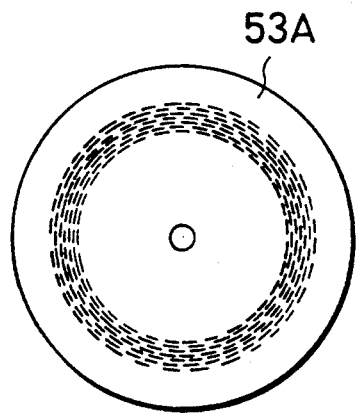

Similarly, it is possible to read information recorded on recording media 51A and 52A respectively having radial bar codes as shown in FIG. 7b and normal bar codes as shown in FIG. 7c, or information recorded on concentric or spiral tracks of a recording medium 53A as shown in FIG. 7d.

For example, the recording medium 53A shown in FIG. 7d is concretely constructed by an optical disk. In the embodiment shown in FIGS. 6a and 6b, it is possible to read information out of such an optical disk without rotating the optical disk. Further, in the embodiment shown in FIGS. 6a and 6b, it is possible to write optical information along tracks as shown in FIGS. 7a and 7d if light-emitting intensity of the light source 41 is modulated and a recording medium having a magnetic film made of an amorphous alloy, etc. is arranged in conformity with the scanned face 46.

FIGS. 8a to 8d show an optical scanner having a fourth structure in accordance with one embodiment of the present invention. For brevity, constructional portions similar to those in FIGS. 4a and 4b are designated by the same reference numerals.

A light beam emitted from a light source 41 is changed to a converged light beam by a coupling lens 42 constituting a light source device together with the light source 41. The converged light beam is incident to a reflection face pair of a return optical deflecting element 43 in parallel to a rotational axis thereof. The return optical deflecting element 43 is similar to that used in the optical scanner shown in FIGS. 4a and 4b. Similar to the optical scanner shown in FIGS. 4a and 4b, the reflecting face pair is formed in the rotational shaft of a motor 44 as a rotational driving means.

The light beam reflected on the reflecting face pair of the return optical deflecting element 43 is transmitted in parallel to the rotational axis thereof and is then incident to a conical face reflecting member 50. As shown in FIG. 8d, the conical face reflecting member 50 has a shape formed by cutting a cone having a vertical angle of 90° into two halves by a plane including a conical axis. A conical face portion is formed as a conical reflecting face and is fixedly supported by an unillustrated supporting means in a constant spatial position of the optical scanner such that no optical path of the light beam is prevented by the supporting means.

As shown in FIG. 8a, a vertex side of the conical face reflecting member 50 is directed on a side of the return optical deflecting element 43. The conical axis of the conical face reflecting member 50 is in conformity with the rotational axis of the return optical deflecting element 43.

The light beam emitted from the light source device is convergent as mentioned above. The convergence of this light beam is adjusted such that the light beam returned by the return optical deflecting element 43 is converged on the conical reflecting face of the conical face reflecting member 50. Therefore, no conical reflecting face is acted as a convex mirror with respect to the light beam reflected on the conical reflecting face.

As shown in FIG. 8b, when the return optical deflecting element 43 is rotated in an arrow direction, the light beam reflected on the conical face reflecting member 50 is deflected such that this light beam is rotated around the rotational axis of the return optical deflecting element 43. The light beam is deflected by the return optical deflecting element 43 such that an arc is drawn around the rotational axis of this return optical deflecting element 43. Accordingly, an incident position of a principal ray of the deflected light beam incident onto the conical reflecting face is separated from the conical axis of the conical face reflecting member 50 by a constant distance. Therefore, no position of the principal ray of the light beam reflected on the conical reflecting face is moved in a direction of the rotational axis of the return optical deflecting element 43. Accordingly, at this time, the principal ray of the deflected light beam is moved on a plane perpendicular to the rotational axis of the return optical deflecting element 43.

The light beam thus deflected by the conical face reflecting member 50 is next incident to an fθ lens 60 as an image forming optical system. This light beam is focused and formed as a light spot on a scanned face 46 by a refracting action of the fθ lens 60. The scanned face 46 is optically scanned by using this light beam at an equal speed in an arrow direction on a scanning line 8 shown in FIG. 8c. It is possible to write information to a recording medium if the recording medium is arranged in conformity with the scanned face 46 and light-emitting intensity of the light source 41 is modulated in accordance with information recorded on the recording medium. Further, it is possible to read information out of an information recording medium. In this case, the information recording medium is arranged in conformity with the scanned face 46. A light beam reflected on this information recording medium is transmitted as return light onto a side of the light source through the fθ lens 60, the conical face reflecting member 50 and the return optical deflecting element 43. The return light is separated and guided to a light-receiving means before the light source device or the light source.

Figure 9A:
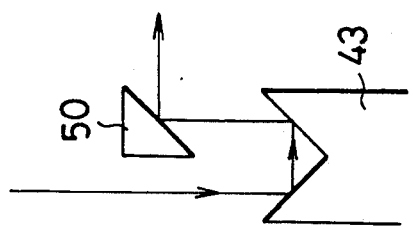
FIGS. 9a to 9f are views showing six examples of the shapes of optical deflecting elements having sixth and seventh structures of the present invention.
Figure 9B:
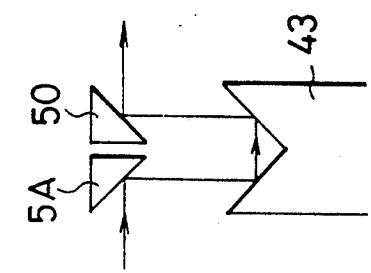

FIGS. 9a to 9f show six examples of a combination of the return optical deflecting element and the conical face reflecting member. FIGS. 9a and 9b show examples in which the return optical deflecting element 43 is separated from the conical face reflecting member 50. FIG. 9a shows a combination of the return optical deflecting element 43 and the conical face reflecting member 50 as shown in FIGS. 8a to 8d. In FIG. 9b, a light beam emitted from the light source device is transmitted in a direction perpendicular to a rotational axis of the return optical deflecting element 43. This light beam is then reflected on a prism 5A and is incident to a reflecting face pair.

Figure 9C:
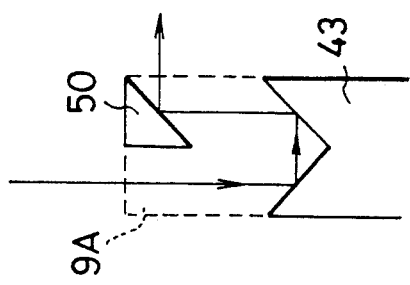
Figure 9D:
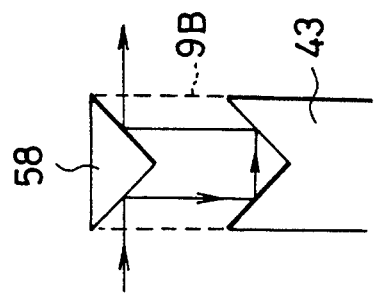

FIGS. 9c to 9f show examples in which the return optical deflecting element and the conical face reflecting member are integrally formed as an optical deflecting element. FIG. 9c shows an example in which the return optical deflecting element 43 and the conical face reflecting member 50 as shown in FIGS. 8a to 8d are integrated with each other by a joining means 9A. In FIG. 9d, the conical face reflecting member 5B is integrated with the return optical deflecting element 43 by a joining means 9B and has a complete conical shape. A portion of a conical reflecting face of this conical face reflecting member 5B is used as a means for bending a light beam emitted from the light source device on a side of the return optical deflecting element 43. In the two examples shown in FIGS. 9c and 9d, an optical path of the light beam from an incident state thereof on a reflecting face pair to a light-emitting state of the light beam reflected and emitted from the conical reflecting face is set as an air region. Accordingly, FIGS. 9c and 9d show a sixth structure of the present invention.

Figure 9E:
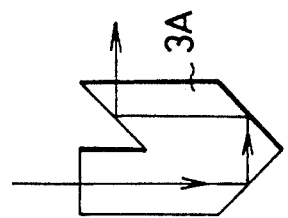
Figure 9F:
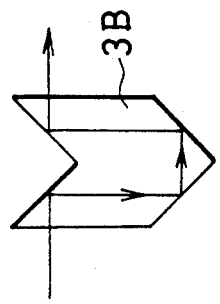

FIGS. 9e and 9f show examples of a seventh structure of the present invention. In this seventh structure, optical deflecting elements 3A and 3B have functions of the return optical deflecting element and the conical face reflecting member. Each of the optical deflecting elements 3A and 3B is integrally formed by a transparent material. The optical deflecting element 3A shown in FIG. 9e has a reflecting face pair formed at one lower end of a columnar rotating body in a direction of a rotational axis thereof. This columnar rotating body is formed by a transparent material. A portion of the rotating body at the other end thereof is partially cut in a conical shape and a conical face portion of this cut portion of the rotating body is set to a conical reflecting face. In the optical deflecting element 3B shown in FIG. 9f, a side of a columnar rotating body opposite to the side of a reflecting face pair thereof is cut in a conical shape having a vertical angle of 90°. A cut conical face portion of the rotating body is formed as a conical reflecting face. Such optical deflecting elements 3A and 3B can be used instead of the return optical deflecting element 43 and the conical face reflecting member 50 in the optical scanner shown in FIGS. 8a to 8d.

FIGS. 10a to 10c show one example of an optical scanner having an eighth structure. In FIGS. 10a to 10c, constructional portions similar to those in FIGS. 4a and 4b are designated by the same reference numerals.

Figure 11:
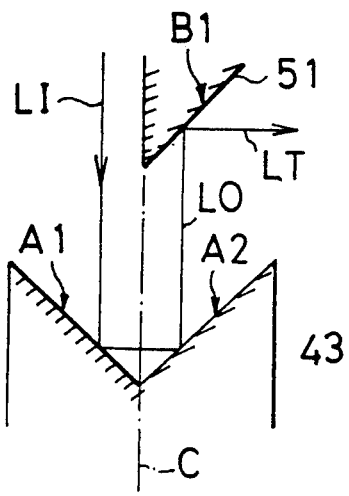
FIG. 11 is a view for explaining the deflection of a light beam in the embodiment shown in FIGS. 10a to 10c.

In FIGS. 10a and 10b, a collimator lens 21 and a light source 41 constitute a light source device. The collimator lens 21 substantially changes a light beam emitted from the light source 41 to a parallel light beam. As shown in FIG. 11, a reflecting member 51 has a plane mirror portion opposite to a return mirror face A2 of a reflecting face pair of a return optical deflecting element 43 and parallel to this return mirror face 42. This plane mirror portion of the reflecting member 51 is constructed by a light-emitting mirror face B1. The reflecting member 51 is integrated with the return optical deflecting element 43 by an unillustrated suitable fixing means. In other words, the return optical deflecting element 43 and the reflecting member 51 integrated with each other by the above fixing means constitute one example of the optical deflecting element having a ninth structure of the present invention.

The light-emitting mirror face B1 of the reflecting member 51 correponds to the return mirror face A2 of the return optical deflecting element 43. Namely, the relation in position between the light-emitting mirror face B1 and the return mirror face A2 is determined such that a light beam reflected on the return mirror face A2 in parallel to a rotational axis of the return optical deflecting element 43 is incident to the light-emitting mirror face B1 at any time.

In FIGS. 10a to 10c, fθ lens 61 is disposed as an image forming optical system. As mentioned above, a parallel light beam is emitted from the light source device and is incident to an incident mirror face A1 of the return optical deflecting element 43 shown in FIG. 11. The light beam is then reflected on this incident mirror face A1 and is further reflected on the return mirror face A2. The light beam is returned from the return mirror face A2 to the light-emitting mirror face B1 of the reflecting member 51 shown in FIG. 11 in parallel to the rotational axis C of the return optical deflecting element 43. The light beam is then reflected on the light-emitting mirror face B1 and is emitted therefrom in a direction perpendicular to the rotational axis C of the return optical deflecting element 43. This emitted light beam is shown by reference numeral LT in FIG. 11. The emitted light beam LT is then focused and formed as a light spot on a scanned face 46 by the fθ lens 61.

The above emitted light beam is deflected when the return optical deflecting element 43 and the reflecting member 51 are integrally rotated. The deflection of this emitted light beam will next be described with reference to FIGS. 12a and 12b.

Figure 12A:
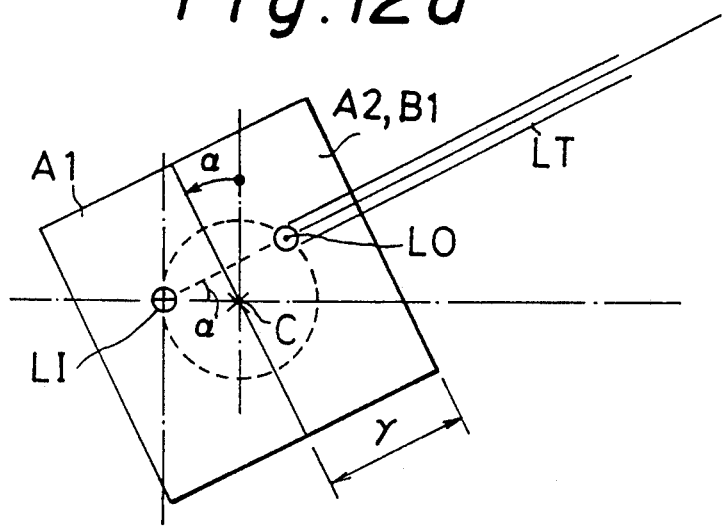
FIGS. 12a and 12b are views for explaining the deflection of a light beam caused by an optical deflecting element having a ninth structure of the present invention.

FIG. 12a shows a deflecting state of the light beam shown in FIG. 11 and seen from a direction of the rotation axis C. For brevity, the mirror faces A1, A2 and B1 are formed in the rectangular shape. A circle shown by a broken line in FIG. 12a shows loci of an incident light beam LI and a returned light beam LO drawn with respect to the reflection face pair in accordance with an integral rotation of the mirror faces A1, A2 and B1. An incident position of the incident light beam LI is set to a constant spatial position of the optical scanner. As shown in FIG. 12a, when the mirror faces A1, A2 and B1 are rotated by angle α from a reference direction such as a direction of an axis of abscissa, it is easily understood by the law of reflection that the emitted light beam LT is emitted in a direction in which the emitted light beam LT is rotated by angle α from the reference direction seen from the incident position of the incident light beam LI. This is because the mirror faces A1 and A2 are opposed to each other such that these mirror faces are perpendicular to each other, and the mirror faces A2 and B1 are parallel to each other.

When the return optical deflecting element and the reflecting member are integrally rotated, the emitted light beam LT is deflected and rotated in the same rotational direction as the return optical deflecting element and the reflecting member at the same rotational speed as the return optical deflecting element and the reflecting member with a principal ray of the incident light beam LT as an axis. Accordingly, when the return optical deflecting element 43 and the reflecting member 51 are integrally rotated at an equal rotational speed, the emitted light beam reflected on the reflecting member 51 is deflected at an equal angular velocity such that this emitted light beam is rotated around the principal ray of the incident light beam as shown in FIG. 10b. A principal ray of the emitted light beam is periodically changed in position in a direction of the rotational axis of the return optical deflecting element 43 in accordance with this deflection of the emitted light beam.

The light beam deflected on the reflecting member 51 is then incident to the fθ lens 61 as an image forming optical system. The light beam is focused and formed as a light spot on the scanned face 46 by a refracting action of the fθ lens 61. As shown in FIG. 10c, the scanned face 46 is optically scanned linearly by the light beam on a scanning line 8 in an arrow direction at an equal speed.

The deflected light beam LT reflected and emitted from the reflecting member 51 is a parallel light beam. Accordingly, the light spot on the scanned face 46 is formed by the fθ lens 61 as an image at infinity on an object side of this lens. Accordingly, as mentioned above, when the return optical deflecting element 43 and the reflecting member 51 are integrally rotated, the emitted light beam is changed in position in the direction of the rotational axis of the return optical deflecting element and the reflecting member, but the light spot linearly scans the scanned face 46 on the scanning line 8.

Thus, the scanned face 46 is optically scanned by the light spot. It is possible to write information to a recording medium if the recording medium is arranged in conformity with the scanned face 46 and light-emitting intensity of the light source 41 is modulated in accordance with information recorded on the recording medium. Further, it is possible to read information out of an information recording medium. In this case, the information recording medium is arranged in conformity with the scanned face 46. A light beam reflected on this information recording medium is transmitted as return light onto a side of the light source through the fθ lens 61, the reflecting member 51 and the return optical deflecting element 43. The return light is separated and guided to an unillustrated light-receiving means before the light source device or the light source.

Figure 13A:
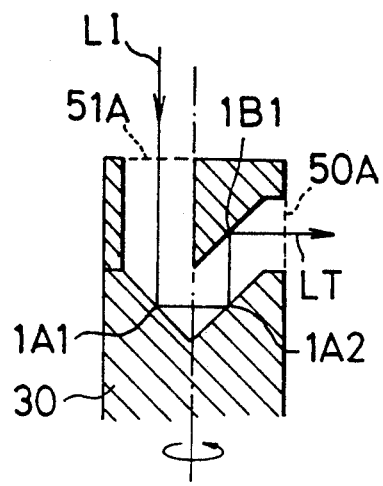
FIGS. 13a to 13k are views for explaining optical deflecting elements having ninth, tenth, eleventh and twelfth structures of the present invention.
Figure 13B:
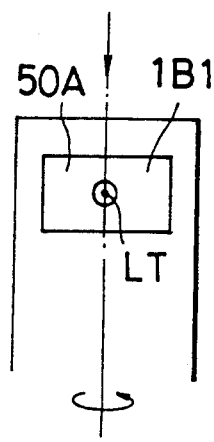

FIGS. 13a to 13k show some concrete examples of optical deflecting elements having ninth, tenth, eleventh and twelfth structures of the present invention. FIGS. 13a and 13b show one example of an optical deflecting element having the eleventh structure of the present invention. In the example shown in FIGS. 13a and 13b, the optical deflecting element has a pair of reflecting faces and one light-emitting mirror face. As shown by a cross-sectional view of FIG. 13a, the entire optical deflecting element is constructed by an integral structure in which an optical path portion of a light beam is formed by making a hole. In FIGS. 13a and 13b, reference numerals 1A1, 1A2, 1B1, 50A and 51A respectively designate an incident mirror face, a return mirror face, a light-emitting mirror face, a window for light emission and a window for light incidence. FIG. 13b is a side view of the optical deflecting element seen from a side of the above window 50A for light emission. As incident light beam LI and an emitted light beam LT are similar to those shown in FIG. 11.

Figure 13C:
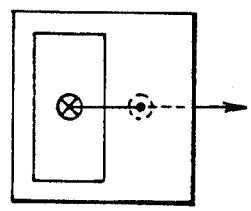
Figure 13D:
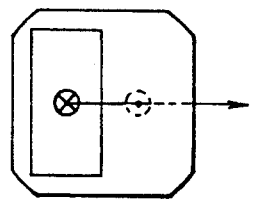
Figure 13E:
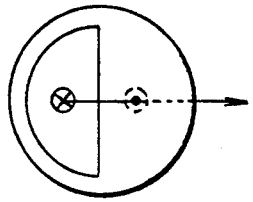

The optical deflecting element may have a rectangular shape shown in FIG. 13c or a circular shape shown in FIG. 13e on a plane perpendicular to a rotational axis of the optical deflecting element. When the optical deflecting element is formed in the shape of a square pole, it is possible to reduce air resistance of the optical deflecting element at the time of a high speed rotation thereof when corner portions of the optical deflecting element are chamfered as shown in FIG. 13d.

Figure 13F:
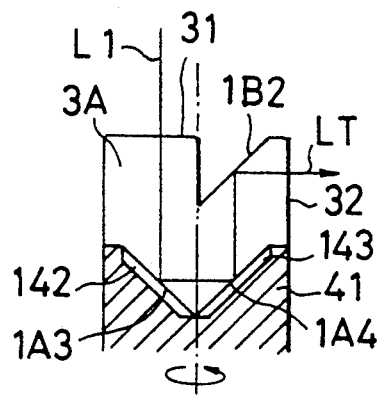
Figure 13G:
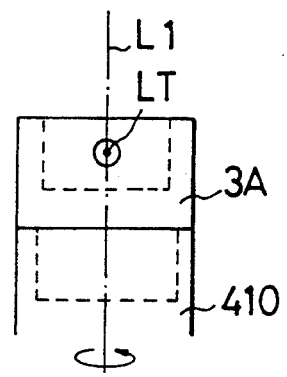

FIGS. 13c and 13d show an example in which the optical deflecting element is integrally formed by a transparent material. The example shown in FIGS. 13f and 13g is a concrete example of an optical deflecting element having the tenth structure of the present invention.

The optical deflecting element integrally formed by a transparent material has a reflecting face pair having an incident mirror face 1A3 and a return mirror face 1A4 formed at one end of the optical deflecting element in a direction of a rotational axis thereof. This reflecting face pair is partially engaged and attached to a rotational shaft 410 of a motor so as to rotate the reflecting face pair. A light-emitting mirror face 1B2 and a light beam incident portion 31 are formed at the other end of the optical deflecting element in the direction of the rotational axis thereof. The optical path of a light beam from the light beam incident portion 31 to a light-emitting face 32 is set as a region of the transparent material. Air layers 142 and 143 are formed in an engaging portion between the motor shaft and the incident and return mirror faces. The light beam is totally reflected on the incident mirror face 1A3, the return mirror face 1A4 and the light-emitting mirror face 1B2.

Figure 13H:
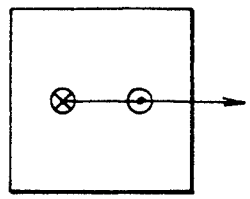
Figure 13I:
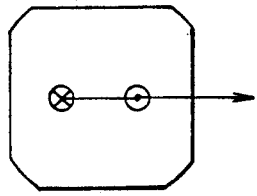
Figure 13J:
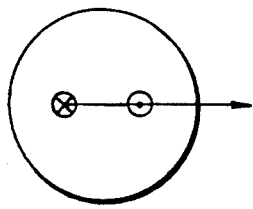
Figure 13K:
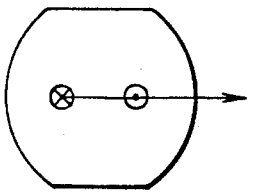

The optical deflecting element may have a rectangular shape as shown in FIG. 13h or a chamfered rectangular shape as shown in FIG. 13a on a plane perpendicular to a rotational axis of the optical deflecting element. Further, the optical deflecting element may have a circular shape as shown in FIG. 13j or a barrel shape as shown in FIG. 13k. In the examples shown in FIGS. 13h and 13i, the light-emitting face of an emitted light beam is a planar face. As explained with reference to FIG. 12a, when the optical deflecting element is rotated by angle α from the reference direction, the emitted light beam is also rotated by angle α in the same direction. Accordingly, in the examples shown in FIGS. 13h and 13i, the emitted light beam LT is emitted from the light-emitting face such that this emitted light beam LT is perpendicular to the light-emitting face at any time. Such a structure constitutes the eleventh structure of the optical deflecting element in the present invention.

Figure 12B:
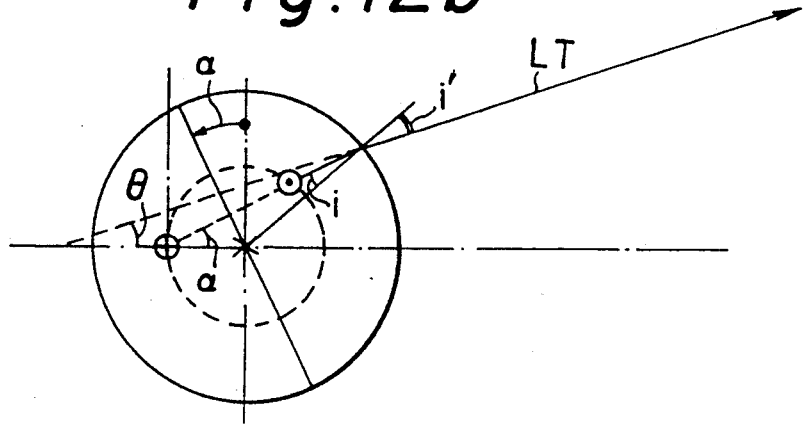

In constrast to this, as shown in FIGS. 13j and 13k, when the light-emitting face is a cylindrical face having a generating line parallel to the rotational axis of the optical deflecting element, the emitted light beam is refracted on the light-emitting face. Such a sturcture constitutes the twelfth structure of the optical deflecting element in the present invention. This twelth structure will next be described with reference to FIG. 12b. The optical deflecting element shown in FIG. 12b relates to FIG. 13j. As shown in FIG. 12b, when the optical deflecting element is rotated by angle α with respect to a reference direction such as a direction of an axis of abscissa, a light beam reflected on the light-emitting mirror face has a finite inclination angle with respect to a normal line direction on the light-emitting face. Therefore, the emitted light beam is refracted on the light-emitting face at an angle i' of refraction in accordance with Snell's law and is emitted from the light-emitting face. This refraction is acted as positive distortion aberration with respect to the emitted light beam LT. Accordingly, the light-emitting face can partially bear a refracting function of the fθ lens as an image forming optical system by setting the light-emitting face to a cylindrical face. Therefore, no excellent fθ characteristics of the fθ lens are required in comparison with a case in which distortion aberration is caused by only the fθ lens. Accordingly, it is easy to design the fθ lens in the present invention.

In the optical deflecting element shown in FIGS. 13c and 13d, the light beam incident portion 31 can be formed at a height lower than that shown in FIG. 13c so as to provide a mass distribution around the rotational axis of the optical deflecting element with axial symmetry. In this case, it is possible to locate a center of gravity of the optical deflecting element on the rotational axis thereof.

The return optical deflecting element and the optical deflecting element mentioned above can be made of glass, etc. However, when the return optical deflecting element and the optical deflecting element are formed by using plastic, these deflecting elements can be easily formed by molding.

As mentioned above, in accordance with the present invention, it is possible to provide a novel return optical deflecting element, a novel optical deflecting element and a novel optical scanner which conventionally do not exist.

When the return optical deflecting element in the present invention is used, an optical scanning operation can be performed along an arc, circular or spiral track of a recording medium. Accordingly, it is not necessary to rotate the recording medium when information is read out of the recording medium and is written to the recording medium. Accordingly, it is possible to simply write and read information out of the recording medium cannot be easily rotated. Further, the optical scanning operation can be linearly performed by using a reflecting member combined with the return optical deflecting element.

In an optical scanner having a second structure of the present invention, a light beam for scanning is incident to a scanned face such that this light beam is perpendicular to the scanned face at any time. Accordingly, it is possible to solve problems about defocusing caused by field curvature in principle.

Further, in the return optical deflecting element and the optical deflecting element in the present invention, it is possible to greatly reduce a radius of gyration in comparison with a general rotary polygon mirror and perform the optical scanning operation at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:

a light source device for emitting a beam of light for optical scanning;

a deflector for deflecting the light beam from the light source device; and means for reflecting the light beam emitted from the deflector in a predetermined direction, said reflector being constructed by a return optical deflecting element and rotational driving means for rotating the return optical deflecting element around a rotational axis thereof, the return optical deflecting element being formed to be rotatable and comprising n reflecting face pairs of each constructed by two reflecting faces opposed to each other such that the two reflecting faces are perpendicular to each other, where n designates a number equal to or greater than one, each of the two reflecting faces being inclined at 45 degrees with respect to the rotational axis of the return optical deflecting element, the reflecting face pairs being arranged with axial symmetry with respect to said rotational axis, and the return optical deflecting element being constructed such that a light beam incident to an arbitrary reflecting face in parallel to said rotational axis is sequentially reflected on this arbitrary reflecting face and a reflecting face constituting the reflecting face pairs together with the arbitrary reflecting face and is returned from the reflecting faces in parallel to said rotational axis, wherein the light source device can be moved in a predetermined direction and the light beam incident to the return optical deflecting element is moved in a direction perpendicular to the rotational axis of the return optical deflecting element in accordance with the movement of the light source device.

2. An optical scanner comprising:

a light source device for emitting a beam of light for optical scanning;

a deflector for deflecting the light beam from the light source device on the same plane at an equal angular velocity; and an image forming optical system for focusing and forming the light beam deflected by the deflector as a light spot on a scanned face, said deflector having a return optical deflecting element, rotational driving means for rotating the return optical deflecting element around a rotational axis thereof, and a conical face reflecting member for reflecting a light beam emitted from said return optical deflecting element in a predetermined direction, said return optical deflecting element being formed to be rotatable and comprising n reflecting face pairs each constructed by two reflecting faces opposed to each other such that the two refelecting faces are perpendicular to each other where n designates a number equal to or greater than one, each of the two reflecting faces being inclined at 45 degrees with respect to the rotational axis of the return optical deflecting element, the reflecting face pairs being arranged with axial symmetry with respect to said rotational axis, the return optical deflecting element being constructed such that a light beam incident to an arbitrary reflecting face in parallel to said rotational axis is sequentially reflected on this arbitrary reflecting face and a reflecting face constituting the reflecting face pairs together with the arbitrary reflecting face and is returned from the reflecting faces in parallel to said rotational axis, and said conical face reflecting member having a conical reflecting face having a vertical angle of 90 degrees and set such that a conical axis of said conical reflecting face is in conformity with the rotational axis of the return optical deflecting element and a vertex side of the conical reflecting face is arranged toward the reflecting face pairs of said return optical deflecting element.

3. An optical scanner as claimed in claim 2, wherein the light beam emitted from the light source device is convergent and a convergent state of the light beam is set such that the light beam is converged on the conical reflecting face of the conical face reflecting member after the light beam is returned by the return optical deflecting element.

4. An optical deflecting element formed to be integrally rotatable as a whole, said optical deflecting element comprising n reflecting face pairs each constructed by an incident mirror face and a return mirror face opposed to each other such that the incident and return mirror faces are perpendicular to each other where n designates a number equal to or greater than one, each of the incident and return mirror faces being inclined at 45 degrees with respect to a rotational axis of the optical deflecting element, the reflecting face pairs being arranged with axial symmetry with respect to said rotational axis, said optical deflecting element further comprising a conical reflecting face having a vertical angle of 90 degrees and a vertex side directed on a side of said reflecting face pairs, the conical reflecting face having a conical axis in conformity with said rotational axis and formed in accordance with the return mirror face of each of the n reflecting face pairs, the optical path of a light beam being set as an air region, and the optical deflecting element being constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is reflected on the conical reflecting face and is emitted from this conical reflecting face.

5. An optical deflecting element formed by a transparent material such that the optical deflecting element can be rotated, said optical deflecting element comprising n reflecting face pairs each constructed by an incident mirror face and a return mirror face opposed to each other such that the incident and return mirror faces are perpendicurlar to each other where n designates a number equal to or greater than one, each of the incident and return mirror faces being inclined at 45 degrees with respect to a rotational axis of the optical deflecting element, the reflecting face pairs being formed at one end of the optical deflecting element in a direction of the rotational axis thereof and arranged with axial symmetry with respect to said rotational axis, said optical deflecting element further comprising a conical reflecting face formed at the other end of the optical deflecting element in the direction of the rotational axis thereof, the conical reflecting face having a vertical angle of 90 degrees and a vertex side directed on a side of said reflecting face pairs, the conical reflecting face having a conical axis in conformity with said rotational axis and formed in accordance with the return mirror face of each of the n reflecting face pairs, and the optical deflecting element being constructed such that a light beam incident to an arbitrary reflecting face in parallel to the rotational axis is sequentially reflected on this arbitrary reflecting face and a reflecting face constituting the reflecting face pairs together with the arbitrary reflecting face and is further reflected on said conical reflecting face and is emitted from the conical reflecting face in a direction perpendicular to said rotational axis.

6. A optical scanner comprising:

a light source device for emitting a beam of light for optical scanning as a parallel light beam;

an optical deflector for deflecting the light beam from the light source device; and an image forming optical system for focusing and forming the light beam deflected by the optical deflector as a light spot on a scanned face, said optical deflector having a return optical deflecting element, a reflecting member for reflecting the light beam from the return optical deflecting element in a predetermined direction, and rotational driving means for rotating the reflecting member and said return optical deflecting element around a rotational axis thereof, said return optical deflecting element being formed to be rotatable and comprising n reflecting face pairs each constructed by an incident mirror face and a return mirror face opposed to each other such that the incident and return mirror faces are perpendicular to each other where n designates a number equal to or greater than one, each of the incident and return mirror faces being inclined at 45 degrees with respect to the rotational axis of the optical deflecting element, the relfecting face pairs being arranged with axial symmetry with respect to said rotational axis, the return optical deflecting element being constructed such that a light beam incident to an arbitrary incident mirror face in parallel to the rotational axis is sequentially reflected on this arbitrary incident mirror face and the return mirror face constituting the reflecting face pairs together with the arbitrary incident mirror face, and is returned from the return mirror face in parallel to the rotational axis, said reflecting member having n light-emitting mirror faces formed such that each of the n light-emitting mirror faces corresponds to the return mirror face of each of said n reflecting face pairs and is inclined at 45 degrees with respect to said rotational axis, the reflecting member being constructed such that a light beam reflected on an arbitrary return mirror face is integrally rotated with said return optical deflecting element while this light beam is reflected on a light-emitting mirror face corresponding to this arbitrary return mirror face, and the optical scanner being constructed such that the parallel light beam from said light source device is incident to an arbitrary incident mirror face of said return optical deflecting element in parallel to the rotational axis.

7. An optical deflecting element formed to be integrally rotatable as a whole, said optical deflecting element comprising n reflecting face pairs each constructed by an incident mirror face and a return mirror face opposed to each other such that the incident and return mirror faces are perpendicular to each other where n designates a number equal to or greater than one, each of the incident and return mirror faces being inclined at 45 degrees with respect to a rotational axis of the optical deflecting element, the reflecting face pairs being arranged with axial symmetry with respect to said rotational axis, the optical deflecting element further comprising n light-emitting mirror faces inclined at 45 degrees with respect to said rotational axis such that each of the n light-emitting mirror faces corresponds to the return mirror face of each of said n reflecting face pairs, the optical path of a light beam being set as an air region, and the optical deflecting element being constructed such that the light beam incident to an arbitrary incident mirror face in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

8. An optical deflecting element formed by a transparent material such that the optical deflecting element can be rotated, said optical deflecting element comprising n reflecting face pairs each constructed by an incident mirror face and a return mirror face opposed to each other such that the incident and return mirror faces are perpendicular to each other where n designates a number equal to or greater than one, each of the incident and return mirror faces being inclined at 45 degrees with respect to a rotational axis of the optical deflecting element the reflecting face pairs being formed at one end of the optical deflecting element in a direction of the rotational axis thereof and arranged with axial symmetry with respect to said rotational axis, said optical deflecting element further comprising a light beam incident portion and n light-emitting mirror faces formed at the other end of the optical deflecting element in the direction of the rotational axis thereof, the n light-emitting mirror faces being inclined at 45 degrees with respect to said rotational axis such that each of the n light-emitting mirror faces corresponds to the return mirror face of each of said n reflecting face pairs, the optical path of a light beam being set as a region of the transparent material, and the optical deflecting element being constructed such that the light beam incident to an arbitrary incident mirror face from said light beam incident portion in parallel to the rotational axis is sequentially reflected on this arbitrary incident mirror face and the return mirror face constituting the reflecting face pairs together with the arbitrary incident mirror face, and is further reflected and emitted from a light-emitting mirror face corresponding to this return mirror face.

9. An optical deflecting element as claimed in claim 8, wherein a portion of the optical deflecting element for emitting the light beam reflected on the light-emitting mirror faces is constructed by a plane perpendicular to the emitted light beam.

10. An optical deflecting element as claimed in claim 8, wherein a portion of the optical deflecting element for emitting the light beam reflected on the light-emitting mirror faces is constructed by a cylindrical face having a generating line parallel to the rotational axis.

11. An optical scanner comprising:

a light source device for emitting a beam of light for optical scanning;

a deflector for deflecting the light beam from the light source device, wherein said deflector comprises a return optical deflecting element and rotational driving means for rotating the return optical deflecting element around a rotational axis thereof;

means for reflecting the light beam emitted from the deflector in a predetermined direction; and wherein the light source device can be moved in a predetermined direction and the light beam incident to the return optical deflecting element is moved in a direction perpendicular to the rotational axis of the return optical deflecting element in accordance with the movement of the light source device, wherein the light beam for optical scanning thereby scans a plurality of parallel paths.

12. An optical scanner as claimed in claim 11, wherein the return optical deflecting element is formed to be rotatable and comprises:

n reflecting face pairs each constructed by two reflecting faces opposed to each other such that the two reflecting faces are perpendicular to each other, where n designates a number equal to or greater than one, each of the two reflecting faces being inclined at 45 degrees with respect to the rotational axis of the return optical deflecting element; and wherein the reflecting face pairs are arranged with axial symmetry with respect to said rotational axis.

13. An optical scanner as claimed in claim 12, wherein the return optical deflecting element is constructed such that a light beam incident to an arbitrary reflecting face in parallel to said rotational axis is sequentially reflected on this arbitrary reflecting face and a reflecting face constituting the reflecting face pairs together with the arbitrary reflecting face and is returned from the reflecting faces in parallel to said rotational axis.

* * * * *